United States Patent
Lin (10) Patent No.: US 8,466,594 B1
(45) Date of Patent: Jun. 18, 2013

(54) MOTOR STATOR

(75) Inventor: Yung-Yu Lin, Taoyuan County (TW)

(73) Assignee: Lidashi Industry Co., Ltd., Taoyuan County (TW)

( * ) Notice: Subject to any disclaimer, the term of this patent is extended or adjusted under 35 U.S.C. 154(b) by 0 days.

(21) Appl. No.: 13/372,986

(22) Filed: Feb. 14, 2012

(30) Foreign Application Priority Data

Dec. 1, 2011 (TW) .............................. 100222718 U (51) Int. Cl.
*H02K 3/34* (2006.01)

(52) U.S. Cl.
USPC ...................... 310/215; 310/216.009; 310/214

(58) Field of Classification Search
USPC .............. 310/214, 215, 254.1, 208, 216.001, 310/216.018, 216.009, 216.019, 216.105, 310/216.069
See application file for complete search history.

(56) References Cited

U.S. PATENT DOCUMENTS

| | | | | |
|---|---|---|---|---|
| 5,969,455 | A * | 10/1999 | Sakamoto | 310/194 |
| 6,831,389 | B2 * | 12/2004 | Takano et al. | 310/254.1 |
| 2002/0047457 | A1 * | 4/2002 | Yoshikawa et al. | 310/215 |
| 2007/0040461 | A1 * | 2/2007 | Oohashi et al. | 310/71 |
| 2009/0102311 | A1 * | 4/2009 | Kotani et al. | 310/215 |
| 2010/0026117 | A1 * | 2/2010 | Sakata | 310/85 |

* cited by examiner

*Primary Examiner* — Tran Nguyen
*Assistant Examiner* — Naishadh Desai
(74) *Attorney, Agent, or Firm* — Muncy, Geissler, Olds & Lowe, PLLC (57) ABSTRACT

A motor stator includes a body member having multiple wire-winding grooves that is formed of a stack of silicon steel plates and defines axially a middle section and two end sections, the wire-dinging grooves in the end sections being greater than in the middle section, two wire racks each having foot tubes respectively inserted into the end sections of the body member in the wire-winding grooves beyond the middle section, the foot tubes having an inner diameter not less than the part of the wire-winding grooves corresponding to the middle section, and insulation sheets having a length greater than the height of the middle section of the body member and being respectively set in the wire-winding grooves and the corresponding foot tubes.

7 Claims, 14 Drawing Sheets

MOTOR STATOR

BACKGROUND OF THE INVENTION

1. Field of the Invention

The present invention relates to motor stator technology and more particularly, to a motor stator, which has wire-winding grooves thereof configured to provide a usable cross-sectional area much larger than conventional designs.

2. Description of the Related Art

Figure 15:
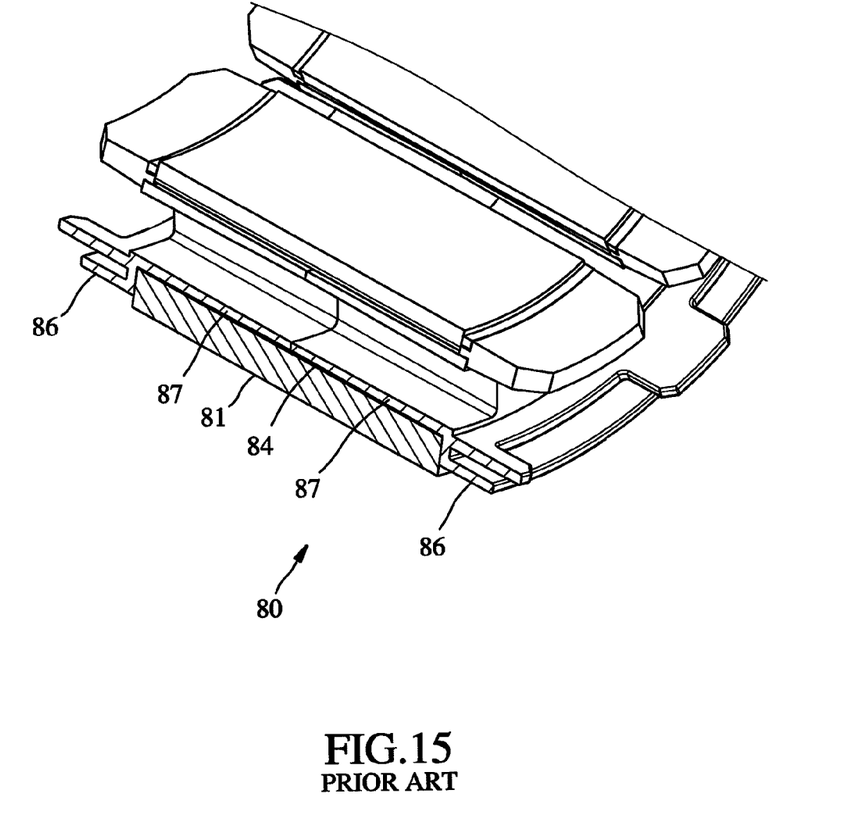
FIG. 15 is a sectional elevation of a part of a motor stator according to the prior art, illustrating one foot tube of each of two wire racks inserted into one respective wire-winding groove.

A motor, as shown in FIG. 15, generally comprises a stator and a rotor. The stator, referenced by 80, comprises a body member 81 and two wire racks 86. The body member 81 is formed of a stack of silicon steel plates, comprising a plurality of inwardly extending polar columns (not shown) and a wire-winding groove 84 between each two adjacent polar columns. Each wire rack 86 comprises a plurality of foot tubes 87 respectively inserted into the wire-winding grooves of the body member 81. The foot tubes 87 of one wire rack 86 are respectively connected to the foot tubes 87 of the other wire rack 86, forming a cylindrical insulation wall in each of the wire grooves 84. Thereafter, coils (not shown) are wound round inside the foot tubes 87 and isolated from the body member 81 by the foot tubes 87.

According to the aforesaid prior art design, the foot tubes of the wire racks are inserted into the inside of the wire-winding grooves. As the wall thickness of the foot tubes occupies a part of the cross-sectional area of the wire-winding grooves, the usable cross-sectional area of the wire-winding grooves is relatively reduced. In consequence, the operation to wind coils in the wire-winding grooves becomes difficult, and the number of turns of the coils is limited.

Further, it is difficult and takes much time to keep the large number of foot tubes of the two wire racks in alignment for connection during installation. In consequence, the motor stator fabrication speed is slowed down.

Further, the foot tubes of the wire racks of the aforesaid prior art motor are made by injection molding. For making foot tubes having different lengths to fit different stators having different thicknesses, a new injection molding mold shall be used, leading to cost increase.

SUMMARY OF THE INVENTION

The present invention has been accomplished under the circumstances in view. It is the main object of the present invention to provide a motor stator, which has wire-winding grooves thereof configured to provide a usable cross-sectional area much larger than conventional designs.

It is another object of the present invention to provide a motor stator, which facilitates installation, and improves motor stator fabrication speed over conventional designs.

To achieve these and other objects of the present invention, a motor stator comprises a body member, two wire racks, and a plurality of insulation sheets. The body member is formed of a stack of silicon steel plates, comprising a plurality of inwardly extending polar columns and a wire-winding groove defined between each two adjacent polar columns. The body member defines in the axial direction thereof a middle section and two opposing end sections at two opposite ends of the middle section. The middle section has a predetermined height. The end sections have a predetermined height. The diameter of the part of the wire-winding grooves corresponding to the end section portions is greater than the diameter of the part of the wire-winding grooves corresponding to the middle section. Each wire rack comprises a plurality of foot tubes axially extended from one side thereof and respectively inserted into the wire-winding grooves of the body member corresponding to the end section portions. The internal space defined in each foot tube axially cutting through the respective wire rack and kept away from the middle section. The foot tubes have a cross section fitting the cross section of the wire-winding grooves corresponding to the middle section of the body member, and an inner diameter the diameter of the part of the wire-winding grooves corresponding to the middle section of the body member. The insulation sheets are shaped like an elongated open frame bar and equal to the wire-winding grooves of the body member in amount. The insulation sheets have a cross section fitting the wire-winding grooves of the body member, and a length greater than the height of the middle section of the body member. The insulation sheets are respectively set in the wire-winding grooves of the body member and the foot tubes of the wire racks for allowing winding of coils in the wire-winding grooves and the foot tubes, and isolated from the body member by the insulation sheets and the wire racks.

Other advantages and features of the present invention will be fully understood by reference to the following specification in conjunction with the accompanying drawings, in which like reference signs denote like components of structure.

DETAILED DESCRIPTION OF THE INVENTION

Referring to FIGS. 1 through 8, a motor stator 10 in accordance with a first embodiment of the present invention is shown. The motor stator 10 comprises a body member 11, two wire racks 21, and a plurality of insulation sheets 31.

The body member 11 is formed of a stack of silicon steel plates. To avoid a blurred vision due to too many lines in the drawing, the body member 11 is illustrated in a block but not in a stack of silicon steel plates. The body member 11 comprises a plurality of inwardly extending polar columns 12, and a wire-winding groove 14 defined between each two adjacent polar columns 12. Further, the body member 11 defines in the axial direction thereof a middle section 111 and two opposing end sections 112 at the two ends of the middle section 111. The middle section 111 has a predetermined height. The end sections 112 have a predetermined height. The diameter of the end wire-winding groove sections 142 of the wire-winding grooves 14 corresponding to the end section portions 112 is greater than the diameter of the middle wire-winding groove sections 141 of the wire-winding grooves 14 corresponding to the middle section 111. From the drawing of FIG. 5, the diameter difference between the end sections 112 and the end wire-winding groove sections 142 can be clearly seen.

Figure 8:
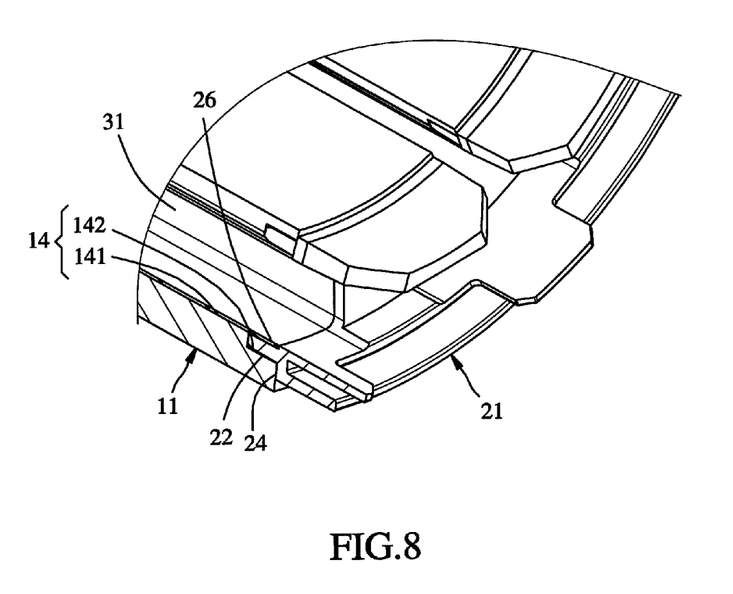
FIG. 8 is an enlarged view of a part of FIG. 7.

The two wire racks 21 each comprise a plurality of foot tubes 22 axially extended from one side thereof. The internal space defined in each foot tube 22 axially cuts through the respective wire rack 21. By means of the foot tubes 22, the wire racks 21 are respectively inserted into the end wire-winding groove sections 142 of the wire-winding grooves 14 corresponding to the end section portions 112 of the body member 11 outside the middle wire-winding groove sections 141. The foot tubes 22 have a cross section fitting the cross section of the wire-winding groove sections 141 of the wire-winding grooves 14 of the body member 11. Further, the inner diameter of the foot tubes 22 of the wire racks 21 is equal to the diameter of the wire-winding groove sections 141 of the wire-winding grooves 14 of the body member 11. In this embodiment, the foot tubes 22 have the same length, which is equal to the height of the end section portions 112 of the body member 11. Further, the foot tubes 22 are peripherally attached to the peripheral walls of the end wire-winding groove sections 142 of the wire-winding grooves 14, i.e., the end section portions 112 of the body member 11. Further, as shown in FIG. 8, each wire rack 21 comprises an abutment face 24 abutted against the outer surface of the respective end section portion 112 of the body member 11. Each foot tube 22 comprises a stop flange 26 located on the inside wall thereof corresponding to the abutment face 24.

The insulation sheets 31 are shaped like an elongated open frame bar, having a cross section fitting the wire-winding grooves 14 of the body member 11 and a length greater than the height of the middle section 111 of the body member 11. Further, the number of the insulation sheets 31 is equal to the number of the wire-winding grooves 14 of the body member 11. The insulation sheets 31 are respectively set in the wire-winding grooves 14 of the body member 11 and the foot tubes 22 and respectively stopped between the stop flanges 26 of the two wire racks 21. In this embodiment, the insulation sheets 31 are respectively made by insulating plastics. However, insulating plastic material is not a limitation. Paper can be used for making the insulation sheets 31. Further, in this embodiment, the insulation sheets 31 are shaped like an elongated open frame bar, having a substantially C-shaped cross section.

Thus, coils (not shown) can be wound round in the wire-winding grooves 14 and the foot tubes 22, and insulated from the body member 11 by the insulation sheets 31 and the wire racks 21. As the coils and their winding method are of the known art and not within the scope of the spirit of the present invention, no further detailed description in this regard is provided.

Figure 1:
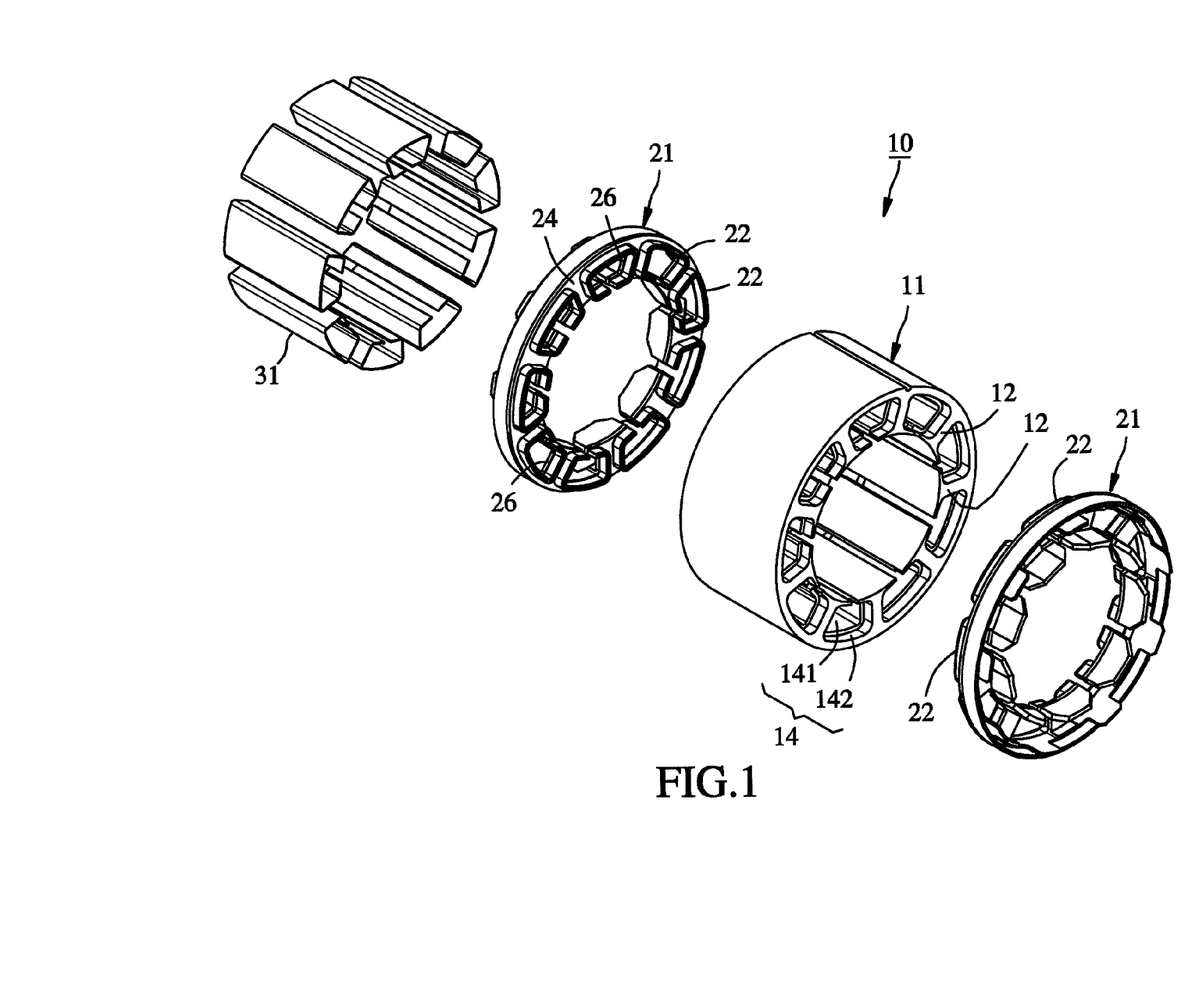
FIG. 1 is an exploded view of a motor stator in accordance with a first embodiment of the present invention.
Figure 2:
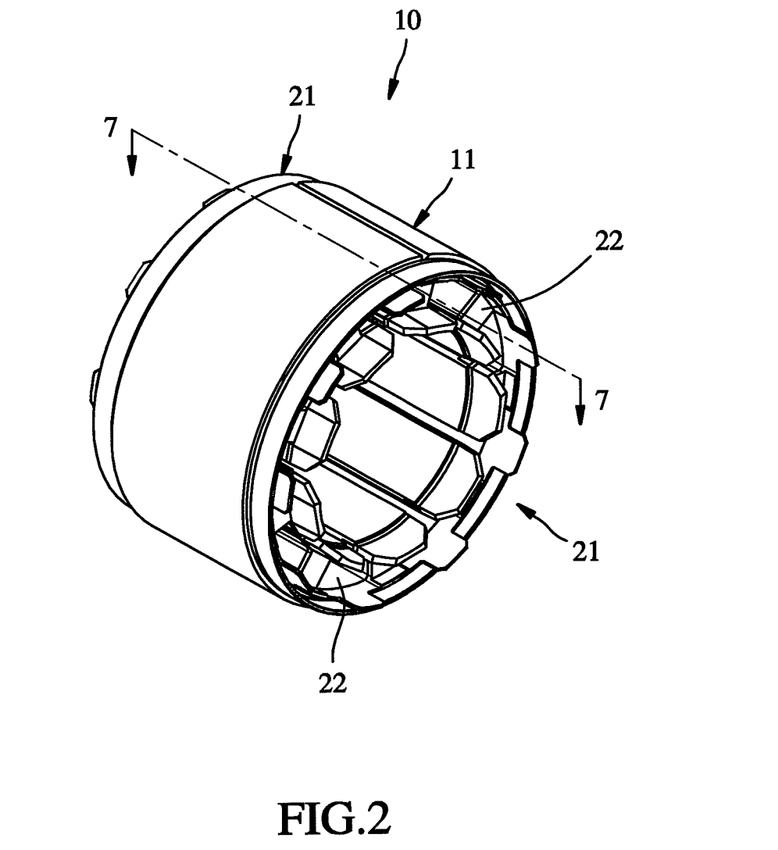
FIG. 2 is an oblique elevation of the motor stator in accordance with the first embodiment of the present invention.
Figure 3:
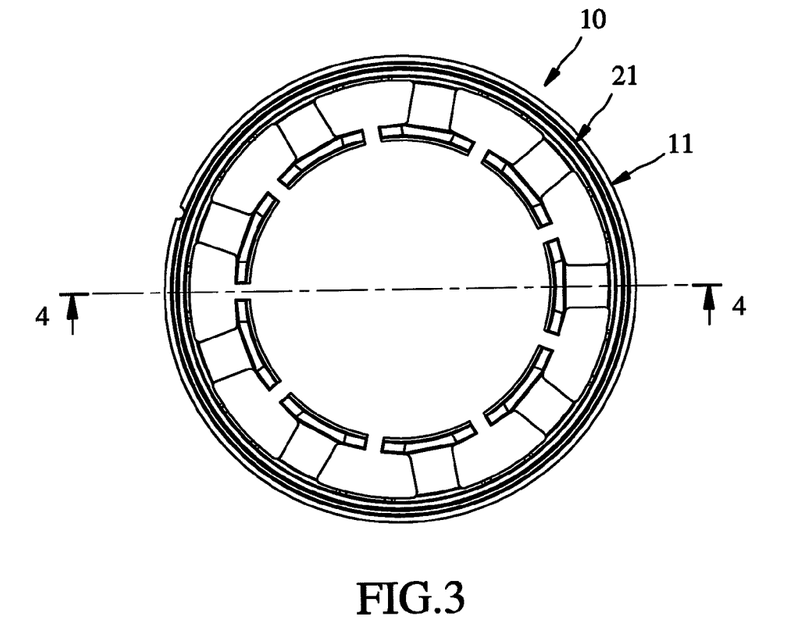
FIG. 3 is a top view of the motor stator in accordance with the first embodiment of the present invention.
Figure 4:
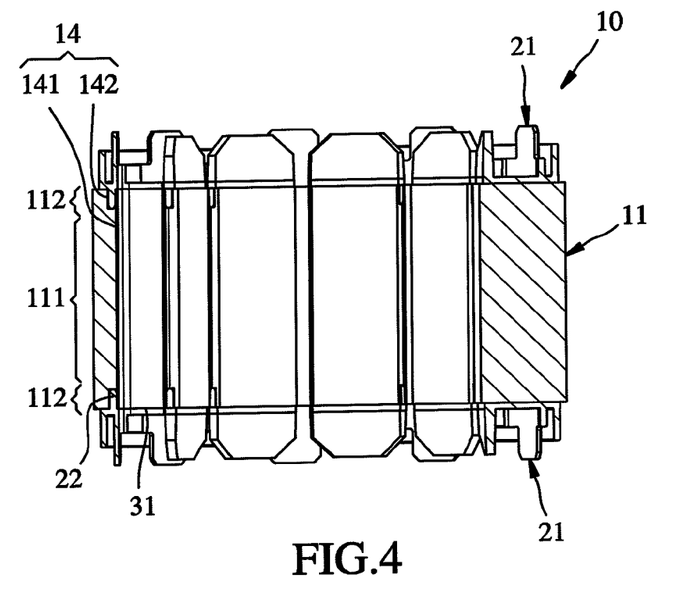
FIG. 4 is a sectional view taken along line 4-4 of FIG. 3.
Figure 5:
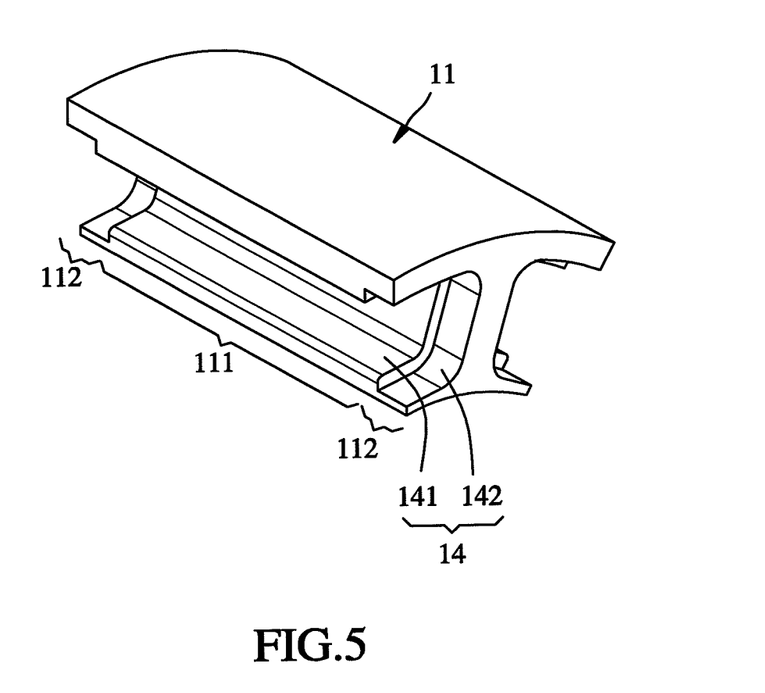
FIG. 5 is an elevational view, in an enlarged scale, of a part of the body member of the motor stator in accordance with the first embodiment of the present invention, illustrating the diameter difference between the wire-winding groove sections of the wire-winding grooves corresponding to the outer section portions and the wire-winding groove sections of the wire-winding grooves corresponding to the middle section portion.
Figure 6:
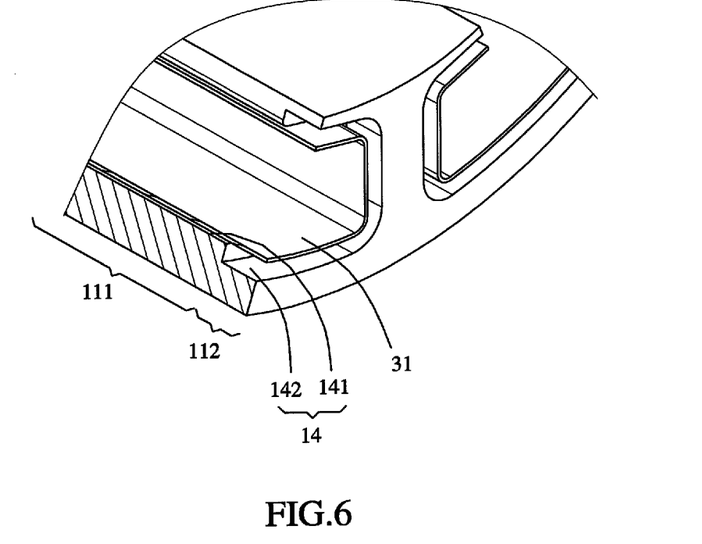
FIG. 6 is a schematic elevational view, in an enlarged scale, of a part of the body member of the motor stator in accordance with the first embodiment of the present invention, illustrating one insulating member inserted into the corresponding wire-winding groove.
Figure 7:
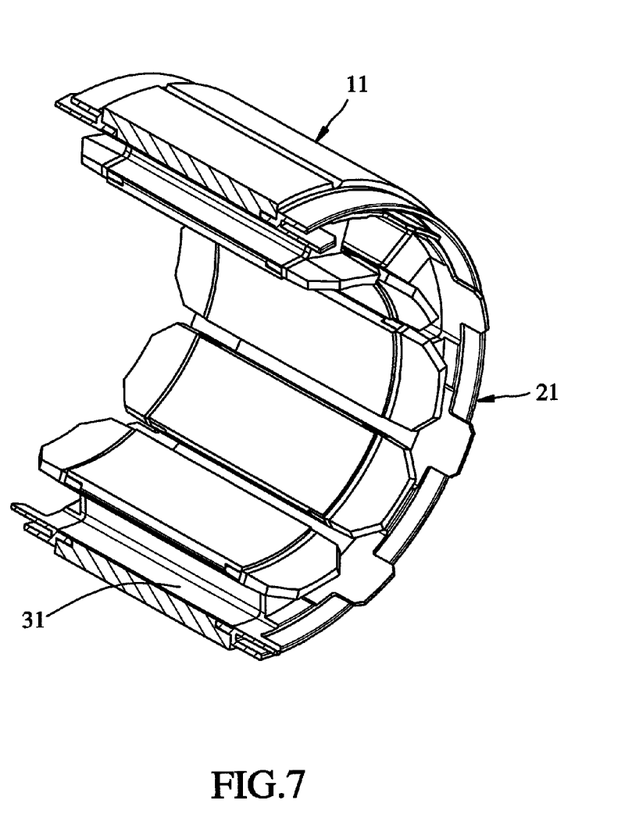
FIG. 7 is a sectional view taken, in an enlarged scale, along line 7-7 of FIG. 2.

During installation of this first embodiment, insert the insulation sheets 31 into the wire-winding grooves 14 respectively. Subject to the design of the C-shaped cross section of the insulation sheets 31, the insulation sheets 31 can be squeezed to reduce its diameter and then inserted into the wire-winding grooves 14. After insertion, the insulation sheets 31 immediately return to their former shape, as shown in FIG. 6. At final, insert the foot tubes 22 of the two wire racks 21 into the end wire-winding groove sections 142 of the wire-winding grooves 14, i.e., the end section portions 112 of the body member 11 to the extent that the abutment faces 24 of the wire racks 21 are respectively abutted against the outer surface of the respective end section portions 112 of the body member 11. After insertion, the insulation sheets 31 enter the respective foot tubes 22 so that the tube walls of the foot tubes 22 are respectively sandwiched between the insulation sheets 31 and the wire-winding grooves 14. Thus, the insulation sheets 31 are stopped in place by the stop flanges 26 of the wire racks 21, as shown in FIGS. 7 and 8.

After installation, the feature that the internal space defined in each foot tube 22 axially cuts through the respective wire rack 21 allows winding of coils (not shown) to be easily performed.

Figure 9A:
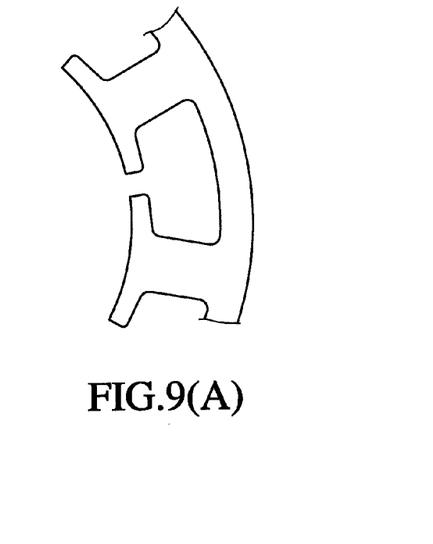
FIG. 9(A) is a schematic drawing illustrating a plain status of one wire-winding groove of the motor stator in accordance with the first embodiment of the present invention.
Figure 9B:
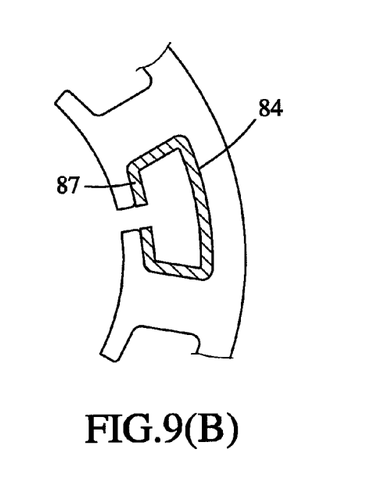
FIG. 9(B) is a schematic drawing illustrating a space occupation status of a foot tube in one wire-winding groove of a motor stator according to the prior art.
Figure 9C:
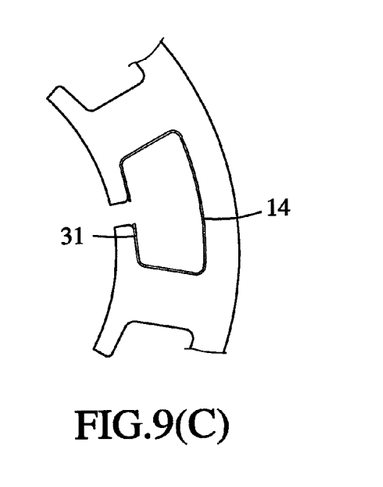
FIG. 9(C) is a schematic drawing illustrating a space occupation status of one insulating member in one respective wire-winding groove of the motor stator in accordance with the first embodiment of the present invention.

As stated above, in this first embodiment of the present invention, the foot tubes 22 of each of the two wire racks 21 are respectively positioned in the end wire-winding groove sections 142 of the wire-winding grooves 14 corresponding to the end section portions 112 of the body member 11; the inner diameter of the foot tubes 22 of the wire racks 21 is equal to the diameter of the wire-winding groove sections 141 of the wire-winding grooves 14 of the body member 11. Thus, the usable cross-sectional area of the wire-winding grooves 14 is the cross-sectional area obtained after deduction of the thickness of the insulation sheets 31 from the cross-sectional area of the wire-winding groove sections 141 of the wire-winding grooves 14 corresponding to the middle section 111 of the body member 11. In other words, the thickness of the insulation sheets 31 is much shorter than the wall thickness of the foot tubes 22 of the wire racks 21, and therefore, the invention simply slightly reduces the cross-sectional area of the wire-winding grooves 14, leaving a usable cross-sectional area in the wire-winding grooves greater than the conventional design for the winding of coils. FIG. 9(A) illustrates the status of the wire-winding grooves before installation of any components. FIG. 9(B) illustrates a space occupation status of a foot tube 87 in one wire-winding groove 84 of a motor stator according to the prior art. As the foot tube 87 has a thick wall thickness, it occupies much space in the respective wire-winding groove 84, and therefore the usable wire-winding space is greatly reduced. FIG. 9(C) illustrates the technique feature of the present invention where simply one insulating member 31 is set in the respective wire-winding groove 14, and therefore the cross-sectional area of each wire-winding groove 14 is simply slightly reduced. Thus, when compared to the prior art motor stator design, the motor stator in accordance with the present provides a relatively larger wire-winding cross-sectional area for winding coils having a relatively larger number of turns. In consequence, a motor constructed according to the present invention has a better performance than a same size motor constructed according to the prior art.

Further, as stated in the above description of the installation of the motor stator, the installation of the motor stator can be done easily by inserting the insulation sheets 31 in the body member 11 and then attaching the wire racks 21 to the body member 11 without any foot tube alignment and connection procedure like the prior art technique. Therefore, the installation of the present invention is much easier than the prior art design, facilitating rapid fabrication.

Further, when making different stators having different thicknesses, the invention simply needs to extend the length of the insulation sheets without the need of making different wire racks having different foot tube lengths like method adopted in the prior art design, thereby saving much the cost.

Figure 10:
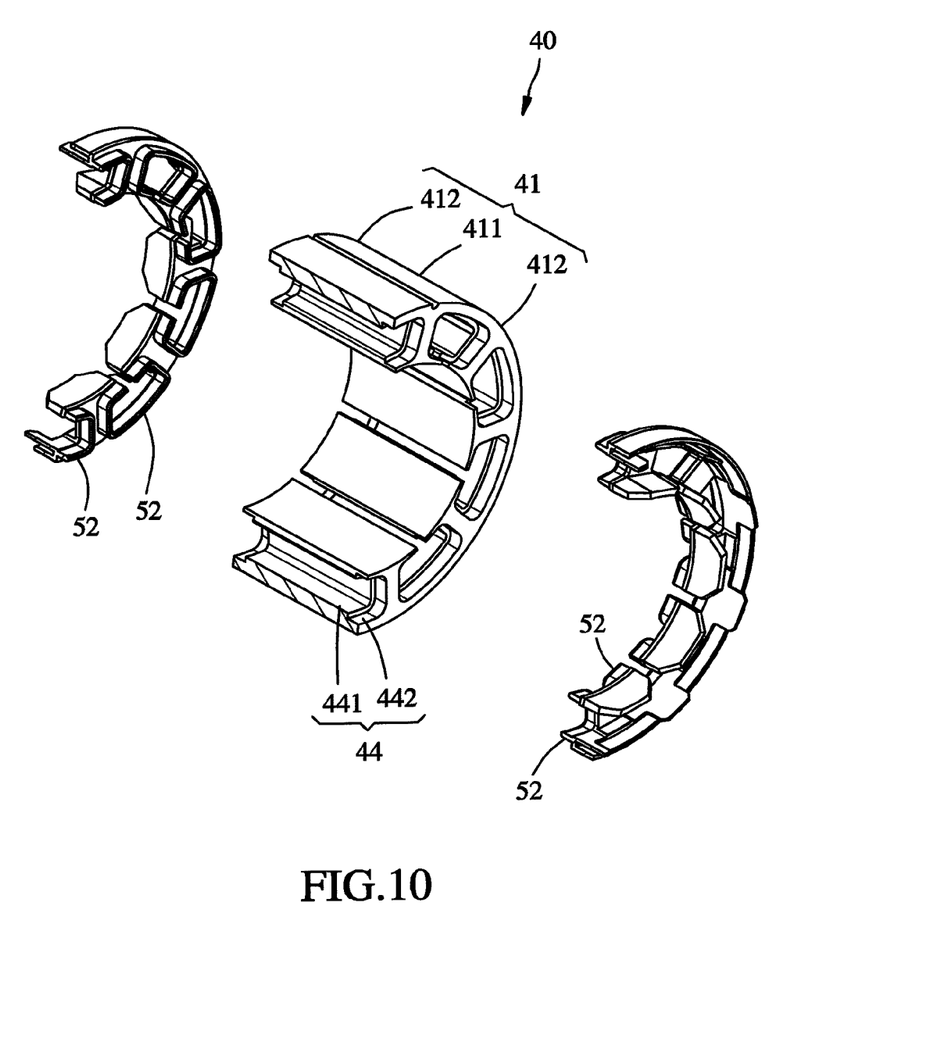
FIG. 10 is an exploded view, in sectional elevation, of a motor stator in accordance with a second embodiment of the present invention.
Figure 11:
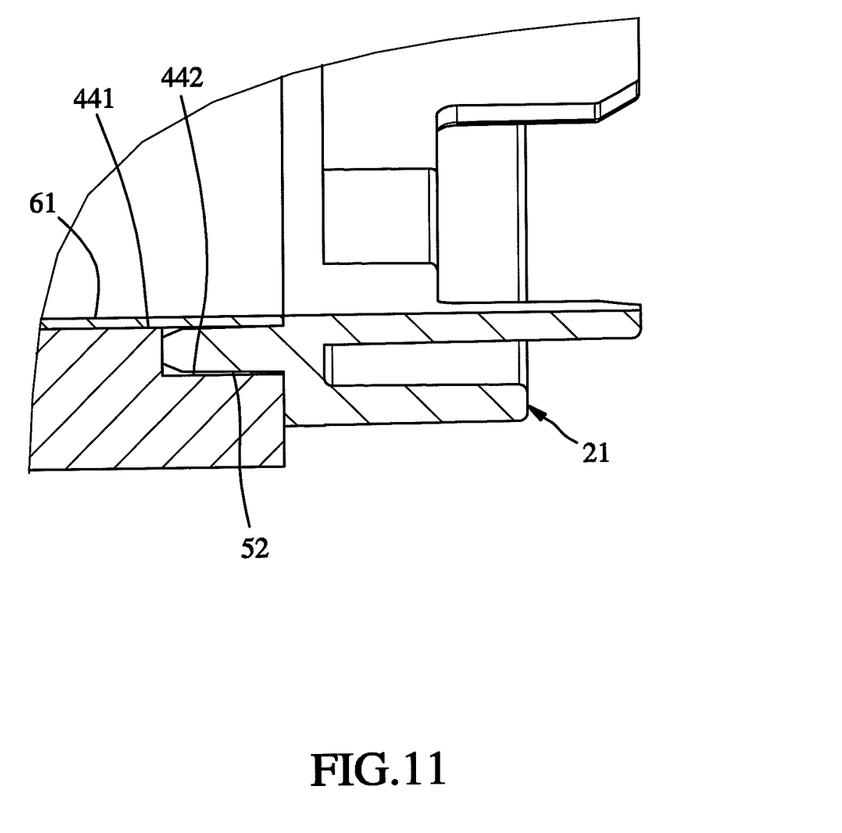
FIG. 11 is a sectional view, in an enlarged scale, of a part of the motor stator in accordance with the second embodiment of the present invention.

FIGS. 10 and 11 illustrate a motor stator 40 in accordance with a second embodiment. This second embodiment is substantially similar to the aforesaid first embodiment with the exceptions as follows:

The wall thickness of the foot tubes 52 reduces gradually in direction toward the distal end thereof such that the inner diameter of the foot tubes 52 starts from the size equal to the diameter of the wire-winding groove sections 441 of the wire-winding grooves 44 corresponding to the middle section 411 of the body member 41 and then reduces gradually in direction toward the distal end. Therefore, the inner diameter of the foot tubes 52 at the distal end thereof is relatively greater than the diameter of the wire-winding groove sections 441 of the wire-winding grooves 44 corresponding to the middle section 411 of the body member 41.

Subject to the characteristic that the wall thickness of the foot tubes 51 reduces gradually in direction toward the distal end, the insulation sheets 61 can easily be inserted into the end wire-winding groove sections 442 of the wire-winding grooves 44 corresponding to the end section portions 412 of the body member 41 and respectively stopped between the stop flanges of the two wire racks. Thus, this second embodiment facilitates rapid installation.

Other structural features and effects of this second embodiment are as same as the aforesaid first embodiment, and therefore, it is not necessary to go into details.

Figure 12:
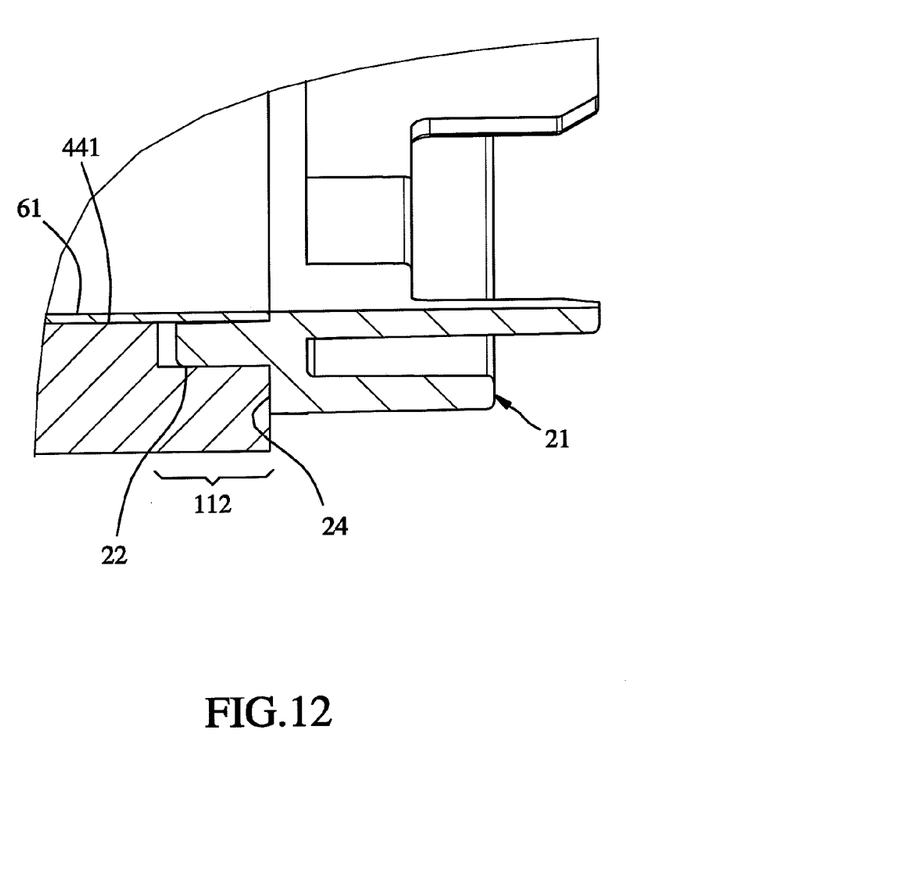
FIG. 12 is a schematic drawing illustrating a supplementary explanation of the technical features of the present invention.

Further, it is to be understood that, in the aforesaid two embodiments, the length of the foot tubes 22 can be shorter than the height of the end section portions 112 of the body member 11, as shown in FIG. 12. Thus, the wire racks 21 have their abutment faces 24 respectively abutted against the outer surfaces of the respective end section portions 112 of the body member 11.

Figure 13:
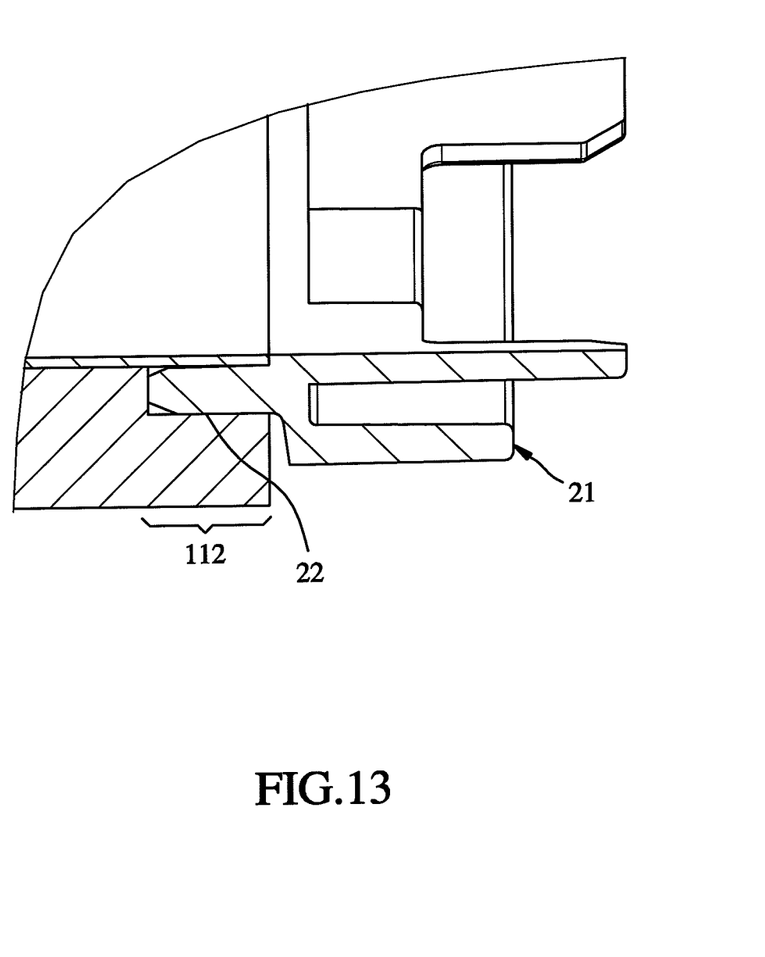
FIG. 13 is a schematic drawing illustrating another supplementary explanation of the technical features of the present invention.

Further, it is to be understood that, in the aforesaid two embodiments, the wire racks 21 can be made without the abutment face. Subject to the relationship that the length of the foot tubes 22 is equal to the height of the end section portions 112 of the body member 11, the ends of the foot tubes 22 are respectively stopped against the opposing end edges of the middle sections of the body member, as shown in FIG. 13.

Figure 14:
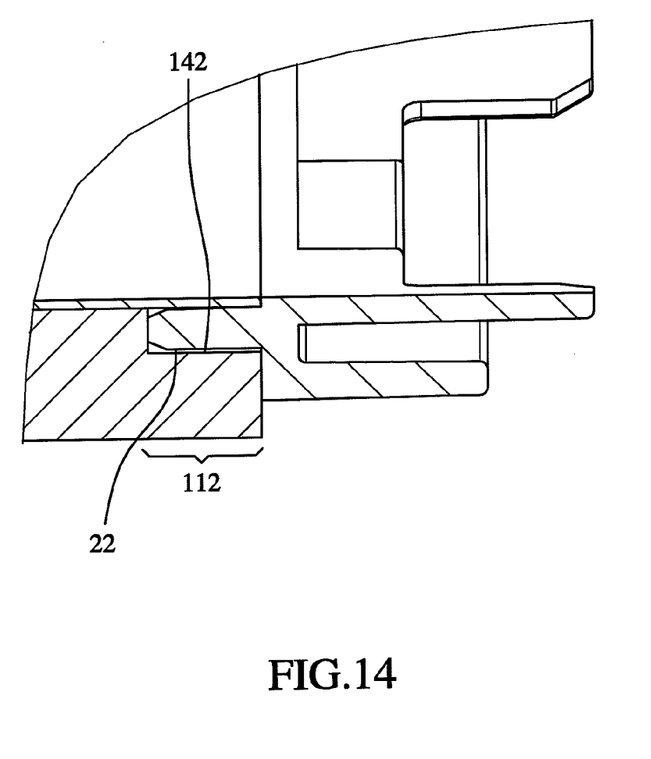
FIG. 14 is a schematic drawing illustrating still another supplementary explanation of the technical features of the present invention.

Further, it is to be understood that the foot tubes 22 can be positioned in the end wire-winding groove sections 142 of the wire-winding grooves 14 corresponding to the end section portions 112 of the body member 11 without touching the peripheral wall of the end wire-winding groove sections 142, as shown in FIG. 14. This non contact feature between the foot tubes 22 and the peripheral wall of the end wire-winding groove sections 142 facilitating insertion of the foot tubes 22 into the end wire-winding groove sections 142 without obstruction.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A motor stator, comprising:
a body member formed of a stack of silicon steel plates, said body member comprising a plurality of inwardly extending polar columns, and a wire-winding groove defined between each two adjacent said polar columns, said body member defining in the axial direction thereof a middle section and two opposing end sections at two opposite ends of said middle section, said middle section having a predetermined height, said end sections having a predetermined height, the diameter of the part of said wire-winding grooves corresponding to said end section portions being greater than the diameter of the part of said wire-winding grooves corresponding to said middle section;
two wire racks, each said wire rack comprising a plurality of foot tubes axially extended from one side thereof and respectively inserted into said wire-winding grooves of said body member corresponding to said end section portions, the internal space defined in each said foot tube axially cutting through the respective wire rack and being kept beyond said middle section, said foot tubes having a cross section fitting the cross section of the part of said wire-winding grooves corresponding to said middle section of said body member, said foot tubes having an inner diameter the diameter of the part of said wire-winding grooves corresponding to said middle section of said body member; and
a plurality of insulation sheets shaped like an elongated open frame bar and equal to said wire-winding grooves of said body member in amount, said insulation sheets having a cross section fitting said wire-winding grooves of said body member and a length greater than the height of said middle section of said body member, said insulation sheets being respectively set in said wire-winding grooves of said body member and said foot tubes of said wire racks for allowing winding of coils in said wire-winding grooves and said foot tubes and isolated from said body member by said insulation sheets and said wire racks.

2. The motor stator as claimed in claim 1, wherein said foot tubes have a same length ≦the height of said end sections of said body member.

3. The motor stator as claimed in claim 2, wherein each said wire rack comprises an abutment face respectively stopped against an outer end edge of the respective end section of said body member.

4. The motor stator as claimed in claim 2, wherein the foot tubes of said wire racks are respectively stopped against opposing end edges of said middle section of said body member.

5. The motor stator as claimed in claim 1, wherein the inner diameter of said foot tubes of said wire racks reduces gradually in direction away from respective wire rack so that the inner diameter of each said foot tube at the distal end thereof is greater than the diameter of a middle part of said wire-winding grooves corresponding to said middle section of said body member.

6. The motor stator as claimed in claim 1, wherein said foot tubes of said wire racks are peripherally attached to said end sections of said body member in said wire-winding grooves.

7. The motor stator as claimed in claim 1, wherein each said foot tube comprises a stop flange located on an inside wall thereof; said insulation sheets are respectively stopped between the stop flanges of said wire racks.

* * * * *